United States Patent [19]
Hattori

[11] Patent Number: 4,762,403
[45] Date of Patent: Aug. 9, 1988

[54] IMAGING OPTICAL SYSTEM HAVING A DISTRIBUTED INDEX LENS

[75] Inventor: Jun Hattori, Yokohama, Japan

[73] Assignee: Canon Kabushiki Kaisha, Tokyo, Japan

[21] Appl. No.: 720,082

[22] Filed: Apr. 4, 1985

[30] Foreign Application Priority Data

| Apr. 13, 1984 | [JP] | Japan | 59-75389 |
| Apr. 16, 1984 | [JP] | Japan | 59-76821 |
| Apr. 18, 1984 | [JP] | Japan | 59-78084 |
| Jun. 19, 1984 | [JP] | Japan | 59-12575 |

[51] Int. Cl.$^4$ .......................... G02B 9/04; G02B 3/00
[52] U.S. Cl. ........................................ 350/413; 350/479
[58] Field of Search ............. 350/96.31, 413, 479–481

[56] References Cited
U.S. PATENT DOCUMENTS 4,639,094  1/1987  Aono .................. 350/413

Primary Examiner—John K. Corbin
Assistant Examiner—Scott J. Sugarman
Attorney, Agent, or Firm—Fitzpatrick, Cella, Harper & Scinto

[57] ABSTRACT

An imaging lens formed by two lenses consisting of a medium whose refractive index continuously varies in conformity with the distance from the optic axis comprises, for example, a first lens disposed on the object side, the first lens having a refractive index distribution in which the refractive index thereof increases away from the optic axis, the shape of the first lens being a shape in which the thickness thereof is greatest on the optic axis and decreases away from the optic axis, and a second lens disposed on the image side, the second lens having a refractive index distribution in which the refractive index thereof decreases away from the optic axis, the shape of the second lens being a shape in which the thickness thereof is smallest on the optic axis and increases away from the optic axis.

42 Claims, 8 Drawing Sheets

IMAGING OPTICAL SYSTEM HAVING A DISTRIBUTED INDEX LENS

BACKGROUND OF THE INVENTION

1. Field of the Invention

This invention relates to an imaging lens suitable, for example, as a photographic lens which uses a medium in which exists a so-called refractive index distribution in which the refractive index thereof gradually varies about the optic axis in a plane orthogonal to the optic axis.

2. Description of the Prior Art

Heretofore, almost all imaging lenses have been constructed by the use of a medium whose refractive index is uniform, and for example, an imaging lens having a half angle of view of 23° and F-No. of the order of 1.4–1.8 is usually constructed of six to seven lenses of a homogeneous medium, as noted in a photographic lens. If such lens can be constructed of fewer lenses, it will be very advantageous in respect of a reduction in the labor required for lens working, simplification of the lens holding mechanism and a reduction in the possibility of injecting a fabrication error such as eccentricity into the manufacture of the lens. However, according to the designing technique using the conventional homogeneous medium, it is very difficult to reduce the number of constituent lenses while maintaining the optical performance.

On the other hand, in recent years, the distributed index lens has been drawing attention as a novel optical technique, and numerous applications thereof to an array lens used an erect one-to-one magnification imaging element, a collimator lens taking only the imaging on or near the axis into consideration, a pickup lens for optical disc, etc. have been proposed. Further, in the article of Atkinson et al. (Applied Optics, Vol.21, No.6, 1982), application of the distributed index lens to a photographic lens is reported. This photographic lens is comprised of two distributed index lenses, that is, on the object side, there is disposed a first lens having a meniscus shape in which the thickness thereof is smallest on the optic axis and increases away from the optic axis and having its convex surface facing the object side and having a refractive index distribution in which the refractive index thereof is highest on the optic axis and continuously decreases away from the optic axis, and on the image side, there is disposed a second lens having a meniscus shape in which the thickness thereof is smallest on the optic axis and increases away from the optic axis and having its convex surface facing the image side and having a refractive index distribution in which the refractive index thereof is highest on the optic axis and continuously decreases away from the optic axis. By this construction, a standard lens in which the F-No. is 2 is provided and, as compared with the conventional imaging lens comprising homogeneous lenses, this lens greatly reduces the number of lenses used. An application of the distributed index lens to an imaging lens having a relatively great angle of view is hardly found except in this report.

SUMMARY OF THE INVENTION

It is an object of the present invention to provide an imaging lens system which uses a medium in which a refractive index distribution exists and is comprised of a very small number of lenses and yet in which aberrations are well corrected and which has a wide angle of view applicable to a photographic lens or the like.

DESCRIPTION OF THE PREFERRED EMBODIMENTS

Figure 1:
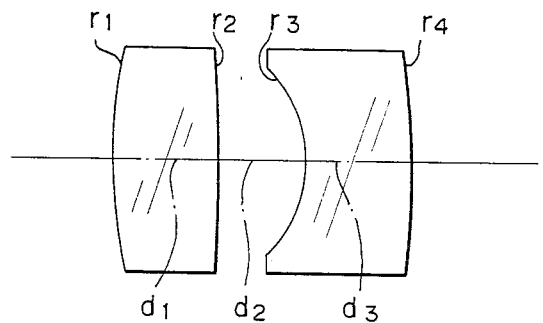
FIG. 1 shows the lens cross-section of an embodiment of the imaging lens according to the present invention.

The refractive index N(r) of a so-called radial gradient lens in which the refractive index N varies in conformity with the distance r from the optic axis as in the lens constituting the imaging lens of the present invention is expressed as $$N(r) = N_0 + N_1 r^2 + N_2 r^4 + N_3 r^6 + ...,$$

where $N_0$, $N_1$, $N_2$, $N_3$, ... are constants and r represents the distance from the optic axis. A lens having such a refractive index distribution has the following features:

(1) The refractive index distribution itself has a refractive power. Accordingly, the degree of freedom of designing in the paraxial area is great.

(2) The refractive index distribution has a contribution to Petzval sum. Where the refractive index distribution is endowed with a positive refractive power, its contribution to Petzval sum is smaller than where the refracting surface is endowed with an equivalent refractive power. Accordingly, it is relatively easy to made the Petzval sum into an appropriate value and correct curvature of image field.

(3) There is an aberration correction effect similar to a non-spherical surface. That is, various aberrations can be controlled in a certain range without affecting the paraxial amount by distribution factors $N_2$, $N_3$, ... of the fourth order or higher.

(4) There is an achromatization effect. That is, the wavelength-dependency of the factor $N_1$ of the first order has an influence on the chromatic aberration coefficient and thereby chromatic aberration can be controlled.

In a first form of the imaging lens according to the present invention, the following construction is adopted by making the most of these features. That is, the imaging lens is formed by two lenses consisting of a medium whose refractive index continuously varies in conformity with the distance from the optic axis. The shape of the first lens disposed on the object side is such a shape that the thickness of the lens is greatest on the optic axis and decreases away from the optic axis (hereinafter such shape will be referred to as the convex shape), and the refractive index distribution thereof has a distribution in which the refractive index is smallest on the optic axis and increases away from the optic axis (hereinafter referred to as the refractive index distribution of a negative refractive power). On the other hand, the shape of the second lens disposed on the image side is such a shape that the thickness of the lens is smallest on the optic axis and increases away from the optic axis (hereinafter such shape will be referred to as the concave shape), and the refractive index distribution thereof has a distribution in which the refractive index is greatest on the optic axis and decreases away from the optic axis (hereinafter referred to as the refractive index distribution of a positive refractive power).

The power of the above-described distributed index lens is determined by the mutual relation between the state of the refractive index distribution and the shape of the lens, and it is desirable that both of the first lens and the second lens have a positive power as shown in the first form of the imaging lens of the present invention. Further, as regards the shape, it is desirable that the surface of the first lens which is adjacent to the object side be convex toward the object side and the surface of the second lens which is adjacent to the object side be concave toward the object side.

As already described, it is more advantageous in correcting curvature of image field to allot a positive refractive power to the refractive index distribution. Accordingly, in the first form of the imaging lens, the refractive index distribution of the second lens is endowed with a positive refractive power and the positive contribution to Petzval sum is made small. Further, by making the shape of the second lens, concave, the second lens, is endowed with a negative contribution to Petzval sum to thereby achieve the correction of curvature of image field and also effect the correction of other aberrations such as spherical aberration. In this case, it is desirable to make the surface which is adjacent to the object side concave for the correction of off-axis aberration. Also, to correct spherical aberration, etc. by the non-spherical effect of the distribution, it is desirable that the distribution factor $N_2$ of the fourth order be a positive value.

Generally, the second lens has a relatively strong positive refractive power as its whole power and therefore, spherical aberration is under-corrected. This is corrected by the refractive index distribution of the negative power of the first lens. In this case, for the correction of aberrations, it is desirable that the distribution factor $N_2$ of the fourth order be a positive value.

It is desirable to satisfy the following conditions in order to effect better correction of aberrations:

$$1.0 \leq r_1/f \leq 2.9 \tag{1}$$

$$-0.52 \leq r_3/f \leq -0.35 \tag{2}$$

$$0.3 \leq d_1/f \leq 0.5 \tag{3}$$

$$0.28 \leq d_3/f \leq 0.53 \tag{4}$$

where f is the focal length of the entire system, $r_1$ and $r_3$ are the radii of curvature, respectively, of the first and third surfaces as counted from the object side, that is, $r_1$ is the radius of curvature of the surface of the first lens which is adjacent to the object side and $r_3$ is the radius of curvature of the surface of the second lens which is adjacent to the object side, $d_1$ is the on-axis thickness of the first lens, and $d_3$ is the on-axis thickness of the second lens.

If $r_1/f$ exceeds the lower limit of condition (1), the spherical aberration created on the surface of the first lens which is adjacent to the object side will become great and the correction in the entire system will become difficult. If $r_1/f$ exceeds the upper limit of condition (1), the refraction of the off-axis rays on the surface of the first lens which is adjacent to the object side will become great and off-axis aberration will be aggravated.

If $r_3/f$ exceeds the lower limit of condition (2), the Petzval sum will become great and the correction of curvature of image field will become difficult. If $r_3/f$ exceeds the upper limit of condition (2), high-order aberrations created on the surface of the second lens which is adjacent to the object side will become great and particularly, the correction of spherical aberration and coma will become difficult.

Conditions (3) and (4) are concerned with the thickness of the lens. If $d_1$ and $d_3$ exceed the lower limits of conditions (3) and (4), the refractive index distribution of each lens will become strong and the various aberrations will be aggravated and also, the manufacture of the medium will become difficult. If the upper limits of conditions (3) and (4) are exceeded, the entire system will become bulky and it will become impossible to secure the back focal length sufficiently.

Embodiments of the imaging lens according to the first form will hereinafter be described. Table 1-1 below shows the lens data of the first to seventh embodiments of the imaging lens according to the first form. In each embodiment, the half angle field of view is 24°. In Embodiments 1 and 2, the F-No. is 1.8 and in the other embodiments, the F-No. is 1.4, and the focal length is standardized to 1. The surface No. i means the ith lens surface as counted from the object side and accordingly, ri represents the radius of curvature of the ith surface, and di represents the on-axis thickness or the on-axis air space between the ith surface and the i+1th surface.

Table 1-2 shows the values of the third order spherical aberration coefficient I, the coma coefficient II, the astigmatism coefficient III, the Petzval sum P and the distortion coefficient V in each embodiment shown in Table 1-1 when the object distance is infinite. As seen in Table 1-2, the various aberration coefficients are well corrected in any of the embodiments.

In the first, third and fourth embodiments, the shape of the first lens is a biconvex shape and the shape of the second lens is a meniscus shape having its concave surface facing the object side; in the second embodiment, the shape of the first lens is a meniscus shape having its convex surface facing the object side and the shape of the second lens is a plano-concave shape having its concave surface facing the object side; in the fifth embodiment, the shape of the first lens is a biconvex shape and the shape of the second lens is a plano-concave shape having its concave surface facing the object side; in the sixth embodiment, the shape of the first lens is a plano-convex shape having its convex surface facing the object side and the shape of the second lens is a plano-concave shape having its concave surface facing the object side; and in the seventh embodiment, the shape of the first lens is a biconvex shape and the shape of the second lens is a biconcave shape. When working a medium in which a refractive index distribution exists into a spherical surface, it is necessary to work the medium without eccentricity relative to the optic axis determined by the refractive index distribution, and this is more difficult than the spherical surface working of the conventional homogeneous medium. Accordingly, the second, fifth and sixth embodiments in which one surface of the lens is planar may be said to be greatly effective in mass productivity.

TABLE 1-1

| Surface No. | r | d | $N_0$ | $N_1$ | $N_2$ | $N_3$ |
|---|---|---|---|---|---|---|
| First Embodiment ||||||| 
| 1 | 1.6912 | 0.364 | 1.75 | 0.1280 | 0.4453 | 0 |
| 2 | −4.6099 | 0.237 | 1 | | | |
| 3 | −0.4117 | 0.374 | 1.75 | −2.2306 | 1.7754 | 0 |
| 4 | −1.2035 | 1 | | | | |
| Second Embodiment ||||||| 
| 1 | 1.1800 | 0.369 | 1.7 | 0.0852 | 0.3149 | 0 |
| 2 | 28.5503 | 0.400 | 1 | | | |
| 3 | −0.4768 | 0.452 | 1.8 | −2.6221 | 0.9820 | 0 |
| 4 | 0 | 1 | | | | |
| Third Embodiment ||||||| 
| 1 | 2.6126 | 0.313 | 1.75 | 0.1357 | 0.7665 | −1.0654 |
| 2 | −4.2834 | 0.303 | 1 | | | |
| 3 | −0.3965 | 0.325 | 1.75 | −3.2037 | 5.4545 | −7.2147 |
| 4 | −1.9304 | 1 | | | | |
| Fourth Embodiment ||||||| 
| 1 | 1.5359 | 0.366 | 1.75 | 0.3506 | 0.8013 | −0.1369 |
| 2 | −4.4936 | 0.299 | 1 | | | |
| 3 | −0.4043 | 0.375 | 1.75 | −2.8832 | 4.6000 | −6.0338 |
| 4 | −2.5807 | 1 | | | | |
| Fifth Embodiment ||||||| 
| 1 | 1.8101 | 0.388 | 1.65 | 0.1289 | 0.3939 | 0.0979 |
| 2 | −5.4983 | 0.391 | 1 | | | |
| 3 | −0.4741 | 0.452 | 1.8 | −2.6266 | 4.1560 | −5.662 |
| 4 | 0 | 1 | | | | |
| Sixth Embodiment ||||||| 
| 1 | 1.3090 | 0.333 | 1.65 | 0.0614 | 0.2250 | 0.3095 |
| 2 | 0 | 0.413 | 1 | | | |
| 3 | −0.4772 | 0.452 | 1.8 | −2.6222 | 4.3418 | −5.9467 |
| 4 | 0 | 1 | | | | |
| Seventh Embodiment ||||||| 
| 1 | 1.5213 | 0.448 | 1.75 | 0.3163 | 0.5060 | 3.2856 |
| 2 | −5.0565 | 0.408 | 1 | | | |
| 3 | −0.4451 | 0.485 | 1.75 | −2.6139 | 4.4720 | −6.0611 |
| 4 | 5.7967 | 1 | | | | |

TABLE 1-2

| | I | II | III | P | V |
|---|---|---|---|---|---|
| Embodiment 1 | 0.272 | 0.046 | −0.068 | 0.177 | 0.143 |
| 2 | 0.220 | 0.241 | −0.014 | 0.112 | 0.043 |
| 3 | −0.166 | 0.049 | −0.015 | 0.057 | 0.273 |
| 4 | −0.012 | 0.041 | −0.052 | 0.102 | 0.228 |
| 5 | 0.056 | 0.046 | 0.006 | 0.049 | 0.280 |
| 6 | 0.105 | −0.063 | −0.003 | 0.086 | 0.074 |
| 7 | 0.133 | 0.053 | −0.011 | 0.065 | 0.298 |

Figure 2A:
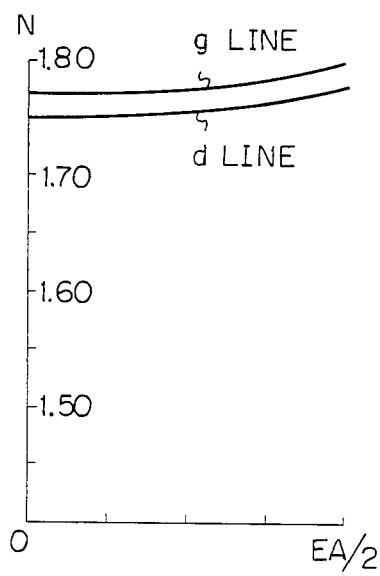
FIGS. 2A and 2B show the refractive index distributions of the respective lenses forming the imaging lens shown in FIG. 1.
Figure 2B:
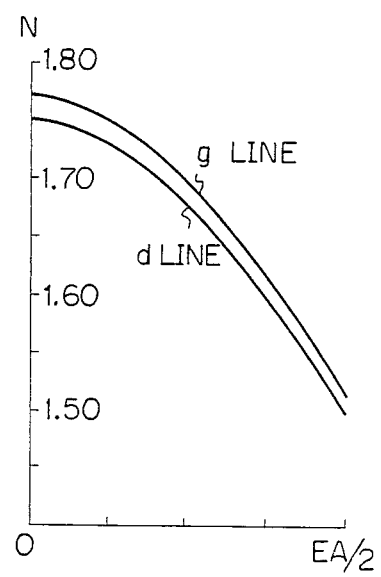
Figure 3:
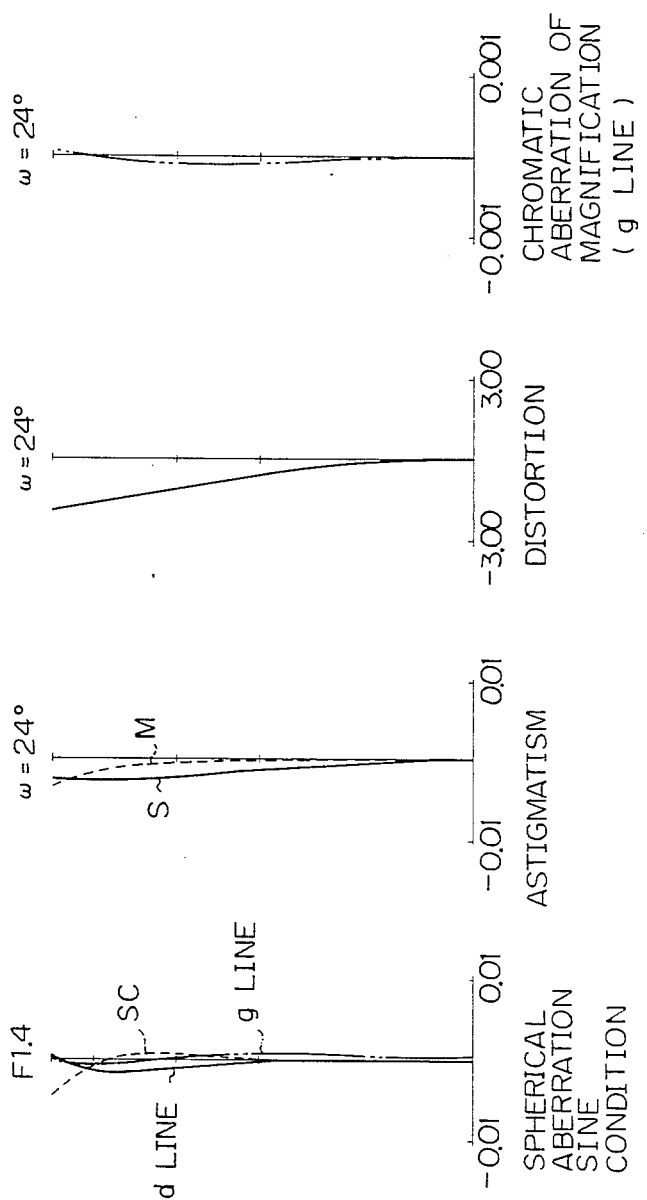
FIG. 3 shows the various aberrations in the imaging lens shown in FIG. 1.

Also, Table 1-3 below shows the lens data of the eighth embodiment of the imaging lens according to the first form, and Table 1-4 below shows the values of the various aberration coefficients of the third order, the on-axis chromatic aberration coefficient L and the lateral chromatic aberration coeffcient T thereof. This embodiment is one in which the correction of chromatic aberration has been achieved, and as seen in Table 1-4, in this embodiment, the chromatic aberration coefficient together with the monochromatic third-order aberration coeffcient is well corrected. The lens cross-section of this eighth embodiment is shown in FIG. 1, the refractive index distributions of the first lens corresponding to d line and g line are shown in FIG. 2A, and the refractive index distributions of the second lens corresponding to d line and g line are shown in FIG. 2B. FIG. 3 shows the various aberrations in the eighth embodiment and it is seen therefrom that aberrations to high orders are well corrected.

TABLE 1-3

| Surface No. | r | d | $N_0$ d line | $N_0$ g line | $N_1$ d line | $N_1$ g line | $N_2$ d line | $N_2$ g line | $N_3$ d line | $N_3$ g line |
|---|---|---|---|---|---|---|---|---|---|---|
| 1 | 2.0721 | 0.378 | 1.75 | 1.77 | 0.1759 | 0.1856 | 0.5414 | 0.5485 | −0.3300 | −0.3983 |
| 2 | −4.4690 | 0.312 | 1 | | | | | | | |
| 3 | −0.4141 | 0.370 | 1.75 | 1.77 | −2.8749 | −2.9112 | 4.5804 | 4.6118 | −5.8245 | −5.9456 |
| 4 | −2.6102 | | 1 | | | | | | | |

TABLE 1-4

| I | II | III | P | V | L | T |
|---|---|---|---|---|---|---|
| −0.011 | 0.023 | −0.024 | 0.083 | 0.242 | −0.0006 | 0.0005 |

Further, when effecting the correction of chromatic aberration in the above-described embodiments, the chromatic aberration created by the refraction of the surface is corrected by the refractive index distribution and therefore, it is desirable to satisfy the following conditions:

$$N_{1G1}(d) < N_{1G1}(g)$$

$$N_{1G2}(d) > N_{1G2}(g)$$

where $N_{1G1}(d)$ and $N_{1G1}(g)$ represent the second-order distribution factors of the refractive index distribution of the first lens for d line and g line, respectively, and $N_{1G2}(d)$ and $N_{1G2}(g)$ represent the second-order distribution factors of the refractive index distribution of the second lens for d line and g line, respectively.

A second form of the imaging lens according to the present invention will now be described. Again in the second form of the imaging lens, the lens is formed by two lenses consisting of a medium whose refractive index continuously varies in conformity with the distance from the optic axis. The shape of a first lens disposed on the object side is such that the thickness of the lens is smallest on the optic axis and increases away from the optic axis (a concave shape) and a meniscus shape having its concave surface facing the image side. The shape of a second lens disposed on the object side is the above-described concave shape and further, the surface of the second lens which is adjacent to the image side is of a planar shape or a shape having its concave surface facing the image side. In both of the first lens and the second lens, the distribution of refractive index thereof is a refractive index distribution in which the refractive index is highest on the optic axis and gradually decreases away from the optic axis (the refractive index distribution of a positive refractive power).

The power of the above-described distributed index lens is determined by the mutual relation between the state of the refractive index distribution and the shape of the lens, and as shown in the embodiments of the lens according to the second form, it is desirable that both of the first lens and the second lens have a positive power. Also, it is desirable that the surface of the second lens which is adjacent to the object side be of a shape having its concave surface facing the object side.

As already described, it is more advantageous in correcting curvature of image field to allot a positive refractive power to the refractive index distribution. Accordingly, again in the second form of the imaging lens, both of the first and second lenses are endowed with a refractive index distribution of a positive refractive power and the positive contribution to Petzval sum is made small. Further, by making the shapes of the two lenses concave, the two lenses are endowed with a negative contribution to Petzval sum to thereby achieve the correction of curvature of image field and also effect the correction of other aberrations such as spherical aberration. In the imaging lens shown in the above-mentioned Atkinson article, if the surface of the second lens which is adjacent to the image side is made convex relative to the image side, the surface of the second lens which is adjacent to the object side becomes sharply concave relative to the object side and on this surface, high-order aberrations are liable to occur. Therefore, in the second form of the imaging lens, the surface of the second lens which is adjacent to the image side is made concave or planar to thereby reduce the allotment of a negative refractive power to the surface of the second lens which is adjacent to the object side. Thereby, particularly the occurrence of high-order spherical aberration and coma is prevented to enable good correction of aberrations to be accomplished.

Also, when working a medium in which a refractive index distribution exists into a spherical surface working, it is necessary to work the medium without eccentricity relative to the central axis of the refractive index distribution, and this is more difficult than the spherical surface working of the conventional homogeneous medium and therefore, in the present invention, making the last surface, i.e., the surface of the second lens which is adjacent to the image side, planar may be said to be very advantageous in mass productivity.

It is desirable to satisfy the following conditions in order to effect even better correction of aberrations:

$$1.7 \leq r_1/f \leq 8.0 \tag{11}$$

$$-1.0 \leq r_3/f \leq -0.55 \tag{12}$$

$$0.23 \leq d_1/f \leq 0.42 \tag{13}$$

$$0.42 \leq d_3/f \leq 0.75 \tag{14}$$

where f is the focal length of the entire system, $r_1$ and $r_3$ are the radii of curvature of the first and third surfaces as counted from the object side, that is, $r_1$ is the radius of curvature of the surface of the first lens which is adjacent to the object side and $r_3$ is the radius of curvature of the surface of the second lens which is adjacent to the object side, $d_1$ is the on-axis thickness of the first lens, and $d_3$ is the on-axis thickness of the second lens.

If $r_1/f$ exceeds the lower limit of condition (11), the spherical aberration created on the surface of the first lens which is adjacent to the object side will become great and the correction thereof in the entire system will become difficult. If $r_1/f$ exceeds the upper limit of condition (11), the refraction of the off-axis rays on the surface of the first lens which is adjacent to the object side will become great and off-axis aberration will be aggravated.

If $r_3/f$ exceeds the lower limit of condition (12), the Petzval sum will become great and the correction of curvature of image field will become difficult. If $r_3/f$ exceeds the upper limit of condition (12), high-order aberrations created on the third surface will become great and particularly, the correction of spherical aberration and coma will become difficult.

Conditions (13) and (14) are concerned with the thicknesses of the lenses. If $d_1$ and $d_3$ exceed the lower limits of conditions (13) and (14), respectively, the refractive index distribution of each lens will become strong and the various aberrations will be aggravated and also, the manufacture of the medium will become difficult. If $d_1$ and $d_3$ exceed the upper limits of conditions (13) and (14), respectively, the entire system will become bulky and the back focal length cannot be secured sufficiently.

Embodiments of the imaging lens according to the second form will hereinafter be described.

Table 2-1 below shows the lens data of the eleventh to fifteenth embodiments of the present invention. In each of these embodiments, the half angle field of view is 24° and the focal length is 1, and in the eleventh and twelfth embodiments, the F-No. is 1.8 and in the thirteenth to fifteenth embodiments, the F-No. is 1.4. The eleventh and fourteenth embodiments are ones in which the surface of the second lens which is adjacent to the image side is concave relative to the image side, and the twelfth, thirteenth and fifteenth embodiments are ones in which the surface of the second lens which is adjacent to the image side is planar.

Also, the thirteenth embodiment is one in which the first and second lenses are endowed with just the same refractive index distribution. If the same medium is thus used for the two lenses, it will be very advantageous in respect of production cost.

Table 2-2 below shows the values of the third order spherical aberration coefficient I, the coma coefficient II, the astigmatism coefficient III, the Petzval sum P and the distortion coefficient V of the embodiments shown in Table 2-1 when the object distance is infinite.

TABLE 2-1

| | Eleventh Embodiment | | | | | |
|---|---|---|---|---|---|---|
| Surface No. | r | d | $N_0$ | $N_1$ | $N_2$ | $N_3$ |
| 1 | 3.7447 | 0.294 | 1.78 | −1.3818 | 0.6954 | 0 |

TABLE 2-1-continued

| Surface No. | Eleventh Embodiment | | | | | |
|---|---|---|---|---|---|---|
| | r | d | $N_0$ | $N_1$ | $N_2$ | $N_3$ |
| 2 | 1.6172 | 0.371 | 1 | | | |
| 3 | −0.7615 | 0.711 | 1.8 | −1.3180 | 1.0963 | 0 |
| 4 | 12.4905 | | | | | |

TABLE 2-2

| | I | II | III | P | V |
|---|---|---|---|---|---|
| Embodiment 11 | 0.117 | 0.010 | 0.026 | 0.062 | 0.118 |
| 12 | 0.178 | 0.024 | 0.103 | 0.020 | 0.031 |
| 13 | 0.108 | −0.061 | 0.006 | 0.074 | 0.103 |
| 14 | 0.018 | 0.026 | 0.052 | 0.036 | 0.218 |
| 15 | 0.055 | −0.009 | 0.023 | 0.073 | −0.008 |

As seen in Table 2-2, the various aberration coefficients are well corrected in any of the embodiments.

Figure 4:
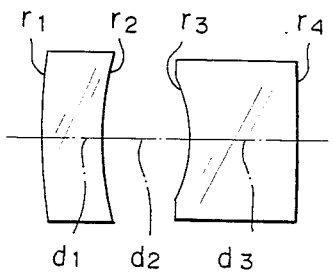
FIG. 4 shows the lens cross-section of a further embodiment of the imaging lens according to the present invention.
Figure 5A:
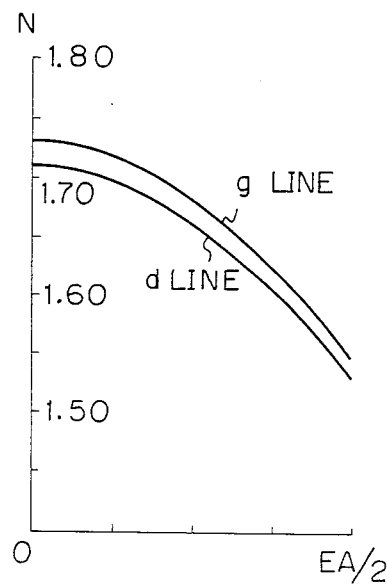
FIGS. 5A and 5B show the refractive index distributions of the respective lenses forming the imaging lens shown in FIG. 4.
Figure 5B:
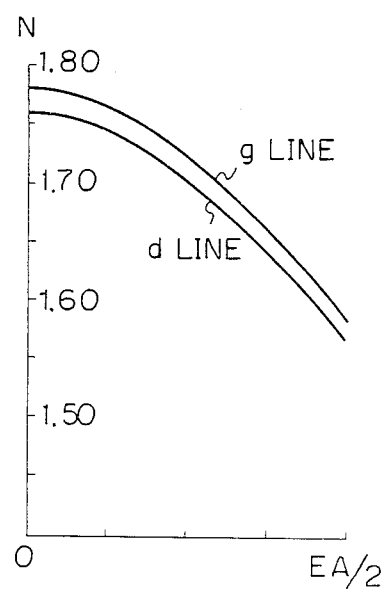
Figure 6:
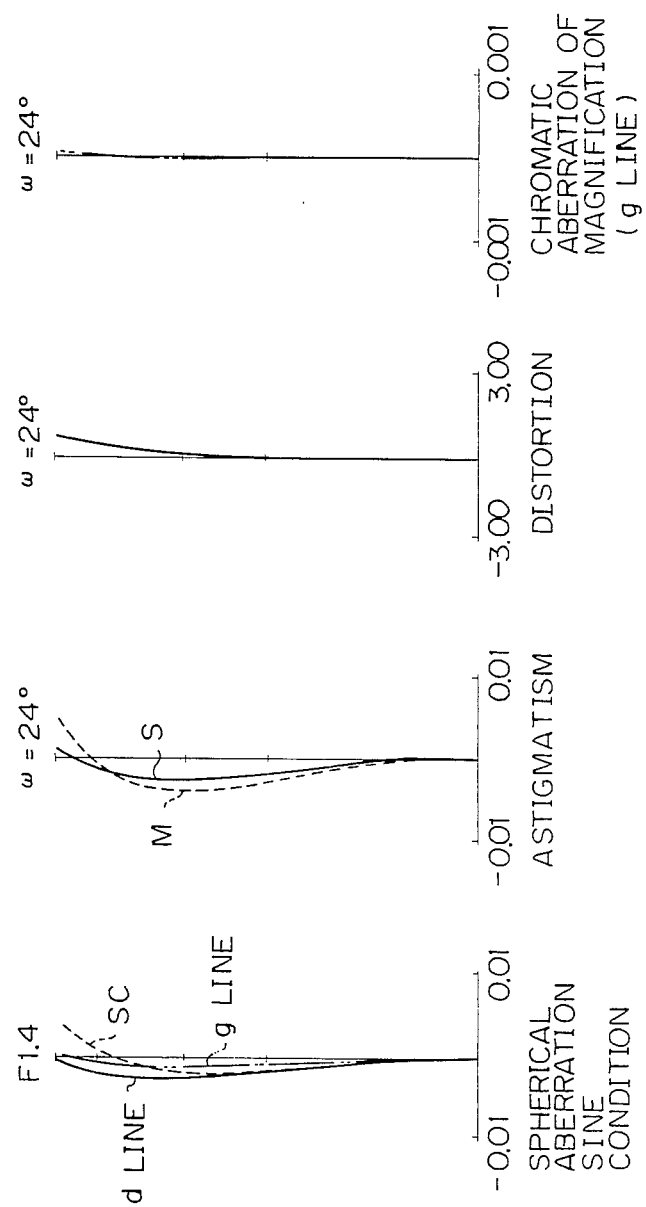
FIG. 6 shows the various aberrations in the imaging lens shown in FIG. 4.

Table 2-3 below shows the lens data of the sixteenth embodiment of the imaging lens according to the second form, and Table 2-4 below shows the values of the third order various aberration coefficients, the on-axis chromatic aberration coefficient L and the lateral chromatic aberration T thereof. This embodiment is one in which the correction of chromatic aberration has been achieved, and as seen in Table 2-4, in this embodiment, the chromatic aberration coefficient together with the monochromatic third order aberration coefficient is well corrected. The lens cross-section of the sixteenth embodiment is shown in FIG. 4, the refractive index distributions of the first lens of the sixteenth embodiment corresponding to d line and g line are shown in FIG. 5A, and the refractive index distributions of the second lens of the sixteenth embodiment corresponding to d line and g line are shown in FIG. 5B. FIG. 6 shows the various aberrations in the sixteenth embodiment, and it will be seen therefrom that the high-order aberrations are well corrected.

TABLE 2-3

| Surface No. | r | d | $N_0$ | | $N_1$ | | $N_2$ | | $N_3$ | |
|---|---|---|---|---|---|---|---|---|---|---|
| | | | d line | g line | d line | g line | d line | g line | d line | g line |
| 1 | 2.2550 | 0.259 | 1.71 | 1.73 | −1.4860 | −1.5067 | 0.6691 | 0.7047 | −0.2504 | −0.4665 |
| 2 | 1.2799 | 0.386 | 1 | | | | | | | |
| 3 | −0.6246 | 0.472 | 1.76 | 1.78 | −2.0479 | −2.0735 | 2.8684 | 2.8938 | −2.1711 | −2.1849 |
| 4 | 0 | | 1 | | | | | | | |

TABLE 2-4

| I | II | III | P | V | L | T |
|---|---|---|---|---|---|---|
| 0.112 | 0.017 | 0.027 | 0.056 | 0.018 | 0.00006 | 0.00007 |

In the imaging lens according to the second form, when effecting the correction of chromatic aberration, the chromatic aberration created by the refraction of the surface is corrected by the refractive index distribution and therefore, it is desirable to satisfy the following conditions:

$$N_{1G1}(d) > N_{1G1}(g)$$

$$N_{1G2}(d) > N_{1G2}(g)$$

where $N_{1G1}(d)$ and $N_{1G1}(g)$ represent the second-order distribution factors of the refractive index distribution of the first lens for d line and g line, respectively, and $N_{1G2}(d)$ and $N_{1G2}(g)$ represent the second-order distribution factors of the refractive index distribution of the second lens for d line and g line, respectively.

A third form of the imaging lens according to the present invention will now be described. Again in the third form of the imaging lens, the imaging lens is formed by two lenses consisting of a medium whose refractive index continuously varies in conformity with the distance from the optic axis. The shape of a first lens disposed on the object side is a shape in which the thickness of the lens is smallest on the optic axis and increases away from the optic axis (a concave shape) and a meniscus shape having its concave surface facing the image side, and the shape of a second lens disposed on the image side is a shape in which the thickness of the lens is smallest on the optic axis and increases away from the optic axis (a concave shape) and a meniscus shape having its concave surface facing the object side. Further, the refractive index distributions of the first and second lenses are refractive index distributions in which the refractive index is highest on the optic axis and decreases away from the optic axis (positive refractive index distributions), and the first and second lenses satisfy the following conditions:

$$2.0 \leq r_1/f \leq 10.0 \tag{21}$$

$$0.9 \leq r_2/f \leq 2.0 \tag{22}$$

where $r_1$ is the radius of curvature of the surface of the first lens which is adjacent to the object side, $r_2$ is the radius of curvature of the surface of the first lens which is adjacent to the image side, and f is the focal length of the entire system.

As already described, in contrast with the lens reported by Atkinson et al. which is formed by two distributed index lenses of a concave shape and a meniscus shape, in the third form of the imaging lens, even better correction of aberrations is effected by giving conditions (21) and (22) to the shape of the lens, whereby a brighter imaging lens of F-No.1.4-1.8 is realized.

Conditions (21) and (22) are concerned with the shape of the first lens. If $r_1/f$ exceeds the lower limit of condition (21) or $r_2/f$ exceeds the lower limit of condition (22), the curvature of each surface of the first lens will become sharp and the spherical aberration created in the first lens will become great. If $r_1/f$ exceeds the upper limit of condition (21) or $r_2/f$ exceeds the upper limit of condition (22), the refraction of off-axis rays in each surface of the first lens will become great and off-axis aberration will be aggravated.

Table 3-1 below shows an example of the values of the third-order spherical aberration coefficient I of the lens according to the present invention which are allotted to the respective surfaces, and Table 3-2 below shows the values of the third-order spherical aberration coefficient I calculated from the lens data appearing in the aforementioned report by Atkinson et al. which are allotted to the respective surfaces. In the lens data of Atkinson et al., $r_1/f=1.588$ and $r_2/f=0.797$ and these exceed the lower limits of conditions (21) and (22), but the comparison between the two shows that in the lens according to the present invention, the absolute values of the values allotted to the first and second surfaces are small and the spherical aberration coefficient of the entire system also is small.

TABLE 3-1

| Surface No. | 1 | 2 | 3 | 4 | Total |
|---|---|---|---|---|---|
| 1 | −2.746 | 2.353 | 0.220 | 0.217 | 0.044 |

TABLE 3-2

| Surface No. | 1 | 2 | 3 | 4 | Total |
|---|---|---|---|---|---|
| 1 | −6.536 | 5.822 | 0.614 | 0.242 | 0.142 |

For good correction of aberrations, it is desirable to further satisfy the following conditions:

$$0.24 \leq d_1/f \leq 0.35 \quad (23)$$

$$0.36 \leq d_3/f \leq 0.5 \quad (24)$$

where $d_1$ and $d_3$ are the center thicknesses, i.e., the on-axis thicknesses, of the first and second lenses, respectively. If $d_1/f$ and $d_3/f$ exceed the lower limits of conditions (23) and (24), the refractive index distribution will become strong and particularly, in a lens wherein the F-No. is brighter than 1.8, the correction of aberrations will become difficult. Also, a medium having a strong refractive index gradient is difficult to manufacture. If $d_1/f$ and $d_3/f$ exceed the upper limits of conditions (23) and (24), the entire system will become bulky and a sufficient back focal length cannot be secured.

Embodiments of the imaging lens according to the third form will now be described.

Table 3—3 below shows the lens data of the twenty-first to twenty-sixth embodiments of the present invention. In each of these embodiments, the half angle field of view is 24° and the focal length is 1, and in the twenty-first and twenty-second embodiments, the F-No. is 1.8 and in the twenty-third to twenty-sixth embodiments, the F-No. is 1.4.

The twenty-sixth embodiment is one in which the first and second lenses are endowed with just the same refractive index distribution. Such use of the same medium for the two lenses is very advantageous in respect of production cost.

Table 3-4 below shows the values of the third-order spherical aberration coefficient I, the coma coefficient II, the astigmatism coefficient III, the Petzval sum and the distortion coefficient V of the embodiments shown in Table 3—3 when the object distance is infinite.

TABLE 3-3

| Surface No. | r | d | $N_0$ | $N_1$ | $N_2$ | $N_3$ |
|---|---|---|---|---|---|---|
| Twenty-first Embodiment | | | | | | |
| 1 | 3.25 | 0.259 | 1.75 | −1.5110 | 0.7682 | 0 |
| 2 | 1.6449 | 0.175 | 1 | | | |
| 3 | −0.5356 | 0.416 | 1.75 | −1.5498 | 1.0296 | 0 |
| 4 | −1.2535 | | 1 | | | |
| Twenty-second Embodiment | | | | | | |
| 1 | 3.5702 | 0.257 | 1.7 | −1.5456 | 0.7738 | 0 |
| 2 | 1.6967 | 0.255 | 1 | | | |
| 3 | −0.5629 | 0.453 | 1.8 | −1.4744 | 0.9760 | 0 |
| 4 | −1.3362 | | 1 | | | |
| Twenty-third Embodiment | | | | | | |
| 1 | 3.6938 | 0.29 | 1.75 | −1.4114 | 0.8622 | −0.6656 |
| 2 | 1.5735 | 0.323 | 1 | | | |
| 3 | −0.5836 | 0.448 | 1.75 | −1.7784 | 1.7560 | −0.4376 |
| 4 | −2.2464 | | 1 | | | |
| Twenty-fourth Embodiment | | | | | | |
| 1 | 8.8847 | 0.288 | 1.6 | −1.4280 | 1.2276 | −1.4825 |
| 2 | 1.6408 | 0.310 | 1 | | | |
| 3 | −0.4671 | 0.463 | 1.6 | −1.7717 | 2.0395 | 1.9478 |
| 4 | −2.1128 | | 1 | | | |
| Twenty-fifth Embodiment | | | | | | |
| 1 | 3.5598 | 0.25 | 1.75 | −1.7067 | 1.2631 | −0.9961 |
| 2 | 1.4927 | 0.301 | 1 | | | |
| 3 | −0.5384 | 0.375 | 1.75 | −1.8953 | 1.8428 | −1.2236 |
| 4 | −1.3896 | | 1 | | | |
| Twenty-sixth Embodiment | | | | | | |
| 1 | 6.4376 | 0.296 | 1.75 | −1.7773 | 1.8903 | −1.5213 |
| 2 | 1.1795 | 0.327 | 1 | | | |
| 3 | −0.6270 | 0.436 | 1.75 | −1.7773 | 1.8903 | −1.5213 |
| 4 | −2.3627 | | 1 | | | |

TABLE 3-4

| | I | II | III | P | V |
|---|---|---|---|---|---|
| Embodiment 21 | 0.226 | −0.118 | 0.001 | 0.090 | 0.197 |
| 22 | 0.188 | −0.095 | −0.031 | 0.104 | 0.064 |
| 23 | 0.044 | −0.002 | −0.005 | 0.088 | −0.003 |
| 24 | 0.004 | −0.049 | −0.102 | 0.151 | 0.002 |
| 25 | −0.002 | −0.076 | −0.007 | 0.089 | −0.028 |
| 26 | 0.037 | −0.092 | 0.007 | 0.050 | −0.025 |

As seen in this table, the various aberration coefficients are well corrected in any of the embodiments.

Figure 7:
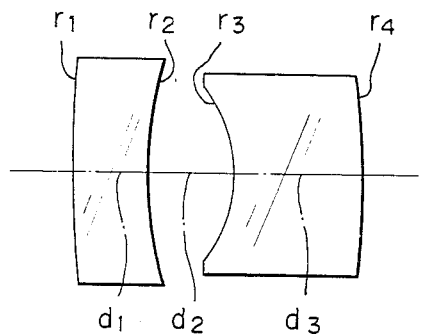
FIG. 7 shows the lens cross-section of still a further embodiment of the imaging lens according to the present invention.
Figure 8A:
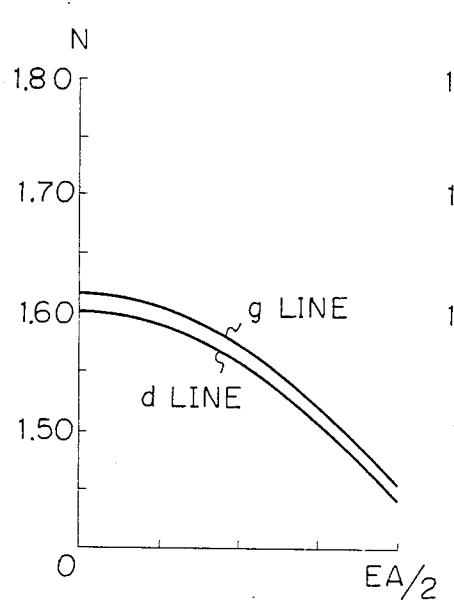
FIGS. 8A and 8B show the refractive index distributions of the respective lenses forming the imaging lens shown in FIG. 7.
Figure 8B:
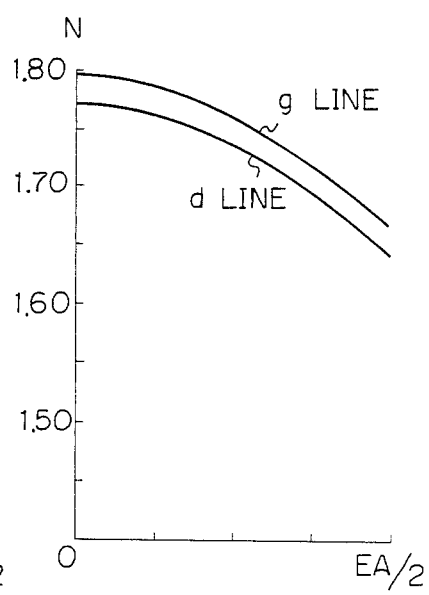

Table 3-5 below shows the lens data of a twenty-seventh embodiment of the present invention, and Table 3-6 below shows the values of the third-order various aberration coefficients, the on-axis chromatic aberration coefficient L and the lateral chromatic aberration T thereof. This embodiment is one in which the correction of chromatic aberration is achieved, and as seen in Table 3-6, the chromatic aberration coefficient together with the monochromatic third-order aberration coefficient is also well corrected. FIG. 7 shows the lens cross-section of the twenty-seventh embodiment, FIG. 8A shows the refractive index distributions of the first lens of the twenty-seventh embodiment corresponding to d line and g line, respectively, and FIG. 8B shows the refractive index distributions of the second lens of the twenty-seventh embodiment corresponding to d line and g line, respectively.

Figure 9:
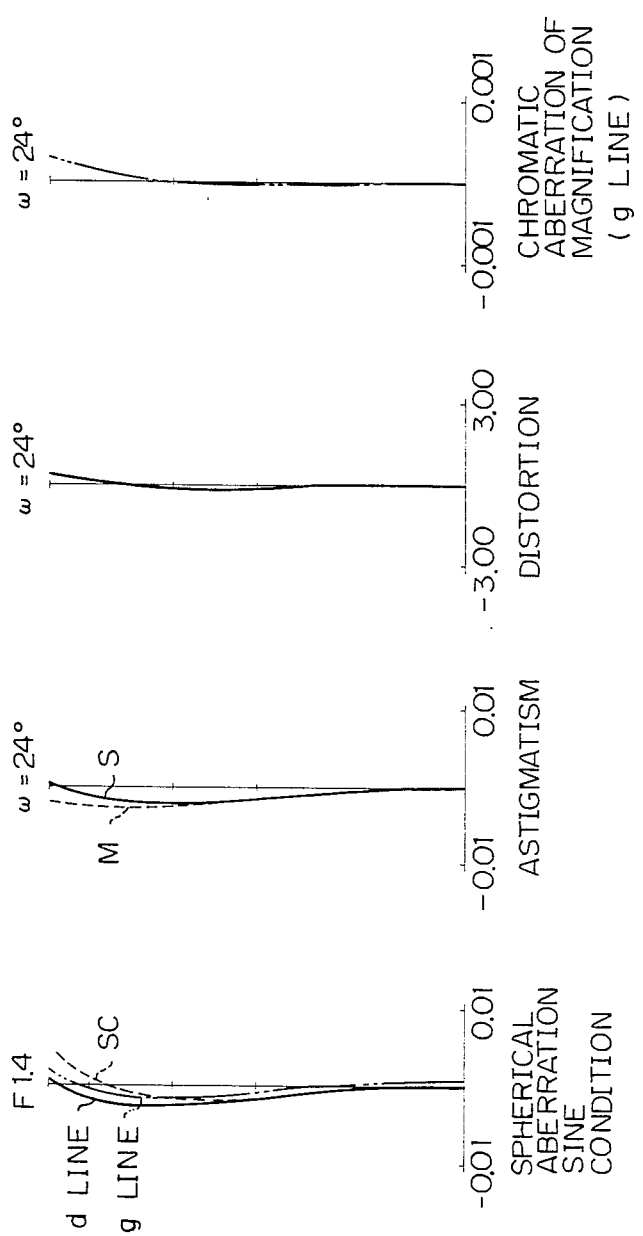
FIG. 9 shows the various aberrations in the imaging lens shown in FIG. 7.

FIG. 9 shows aberrations and it well be seen in this Figure that aberrations are well corrected up to the high order.

TABLE 3-5

| | | | Twenty-seventh Embodiment | | | | | | | |
|---|---|---|---|---|---|---|---|---|---|---|
| | | | $N_0$ | | $N_1$ | | $N_2$ | | $N_3$ | |
| Surface No. | r | d | d line | g line | d line | g line | d line | g line | d line | g line |
| 1 | 1.0433 | 0.283 | 1.6 | 1.615 | −1.3526 | −1.3770 | 0.8667 | 0.8732 | −0.5778 | −0.6251 |
| 2 | 1.5607 | 0.332 | 1 | | | | | | | |
| 3 | −0.5659 | 0.498 | 1.77 | 1.795 | −1.7727 | −1.7944 | 1.7644 | 1.7523 | −0.7859 | −0.6996 |

TABLE 3-5-continued

| | | | Twenty-seventh Embodiment | | | | | | |
|---|---|---|---|---|---|---|---|---|---|
| | | | $N_0$ | | $N_1$ | | $N_2$ | | $N_3$ |
| Surface No. | r | d | d line | g line | d line | g line | d line | g line | d line | g line |
| 4 | −3.1989 | 1 | | | | | | | | |

TABLE 3-6

| I | II | III | P | V | L | T |
|---|---|---|---|---|---|---|
| 0.112 | 0.009 | −0.0010 | 0.083 | 0.047 | −0.0009 | 0.0002 |

Further, where the chromatic aberration of the third form of the imaging lens is to be corrected, the chromatic aberration created by the refraction of the surface is corrected by the refractive index distribution and therefore, it is desirable to satisfy the following conditions:

$$N_{1G1}(d) > N_{1G1}(g)$$

$$N_{1G2}(d) > N_{1G2}(g)$$

where $N_{1G1}(d)$ and $N_{1G1}(g)$ represent the second-order distribution factors of the refractive index distribution of the first lens for d line and g line, respectively, and $N_{1G2}(d)$ and $N_{1G2}(g)$ represent the second-order distribution factors of the refractive index distribution of the second lens for d line and g line, respectively.

A fourth form of the imaging lens according to the present invention will now be described. Again in the fourth form of the imaging lens, the imaging lens is formed by two lenses consisting of a medium whose refractive index continuously varies in conformity with the distance from the optic axis. The shape of a first lens disposed on the object side is such that at least one surface thereof is formed by a planar surface. Where the first lens has a planar surface, it is desirable that the shape thereof is a shape in which the thickness of the lens is smallest on the optic axis and increases away from the optic axis (a concave shape), and the two surfaces of the first lens may be planar. A second lens disposed on the image side has a shape in which the thickness of the lens is smallest on the optic axis and increases away from the optic axis (a concave shape).

Both of the first lens and the second lens may desirably assume such a distribution that the refractive index is highest on the optic axis and gradually decreases away from the optic axis, that is, a positive refractive index distribution.

In the case of a distributed index lens, if one surface thereof is made planar, the surface working will become easier than in a case where both surfaces are spherical surfaces and this is advantageous in respect of cost and mass productivity. From this point of view, in the present invention, at least one of the surfaces of the first lens is made planar. In a distributed index lens, as already described, the degree of freedom of designing is great and therefore, even if one surface thereof is made planar, good correction of aberrations is possible by selecting an appropriate refractive index distribution and shape. It is also possible to made both surfaces of the first lens planar as in embodiments shown later.

Also, making the shape of the second lens concave is chiefly for the purpose of keeping the image plane flat. That is, to keep the Petzval sum at a small value, it is desirable to make the refractive power of the refractive index distribution positive and therefore, the shape of the second lens is made concave and a refractive index distribution of a strong positive refractive power is provided to the second lens.

To effect good correction of aberrations, it is desirable to satisfy the following conditions:

$$-0.95 \leq r_3/f \leq -0.4 \quad (31)$$

$$0.21 \leq d_3/f \leq 0.55 \quad (32)$$

where f is the focal length of the entire system, $r_3$ is the radius of curvature of the surface of the second lens which is adjacent to the object side, and $d_3$ is the on-axis thickness of the second lens.

If $r_3/f$ exceeds the lower limit of condition (31), the absolute value of the negative Petzval sum of this surface will become small and the Petzval sum of the entire system will become great and thus, it will become difficult to keep the image plane flat. If $r_3/f$ exceeds the upper limit of condition (31), the curvature of this surface will become sharp and the occurrence of high-order aberrations will become great.

If $d_3/f$ exceeds the lower limit of condition (32), the gradient of the refractive index will become sharp to obtain a predetermined refractive power and the correction of the various aberrations will become difficult and also, the manufacture of the medium will become difficult. If $d_3/f$ exceeds the upper limit of condition (32), the entire system will become bulky and also, it will become difficult to secure the back focal length sufficiently.

Embodiments of the imaging lens according to the fourth form will hereinafter be described. Table 4-1 below shows the lens data of thirty-first to thirty-fourth embodiments of the present invention. In each of these embodiments, the focal length is 1, the half angle field of view is 23° and the F-No. is 1.8. Table 4-2 below shows the values of the third-order spherical aberration coefficient I, the coma coefficient II, the astigmatism coefficient III, the Petzval sum P and the distortion coefficient V of each embodiment when the object distance is infinite, and the values of the on-axis chromatic aberration coefficient L and the lateral chromatic aberration coefficient T of the thirty-first embodiment. As seen in this table, the various aberrations are well corrected in any of these embodiments.

Figure 10:
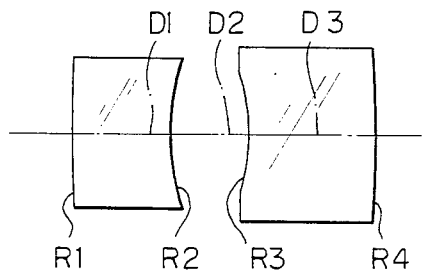
FIG. 10 shows the lens cross-section of yet still a further embodiment of the imaging lens according to the present invention.
Figure 11A:
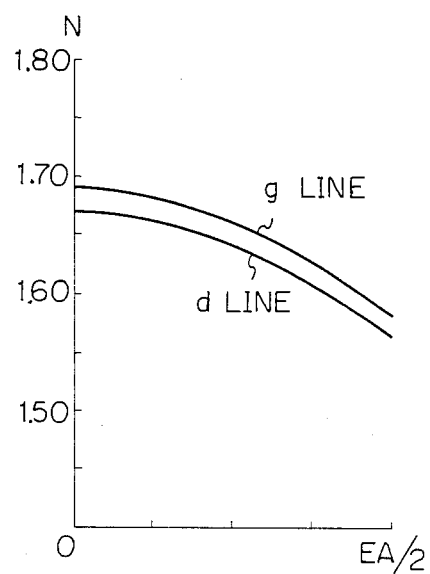
FIGS. 11A and 11B show the refractive index distributions of the respective lens elements forming the imaging lens shown in FIG. 10.
Figure 11B:
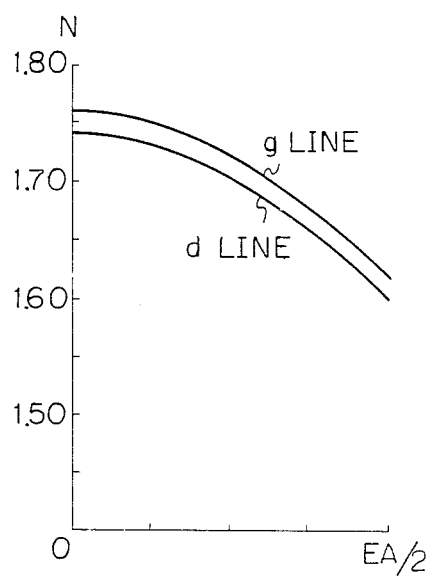
Figure 12:
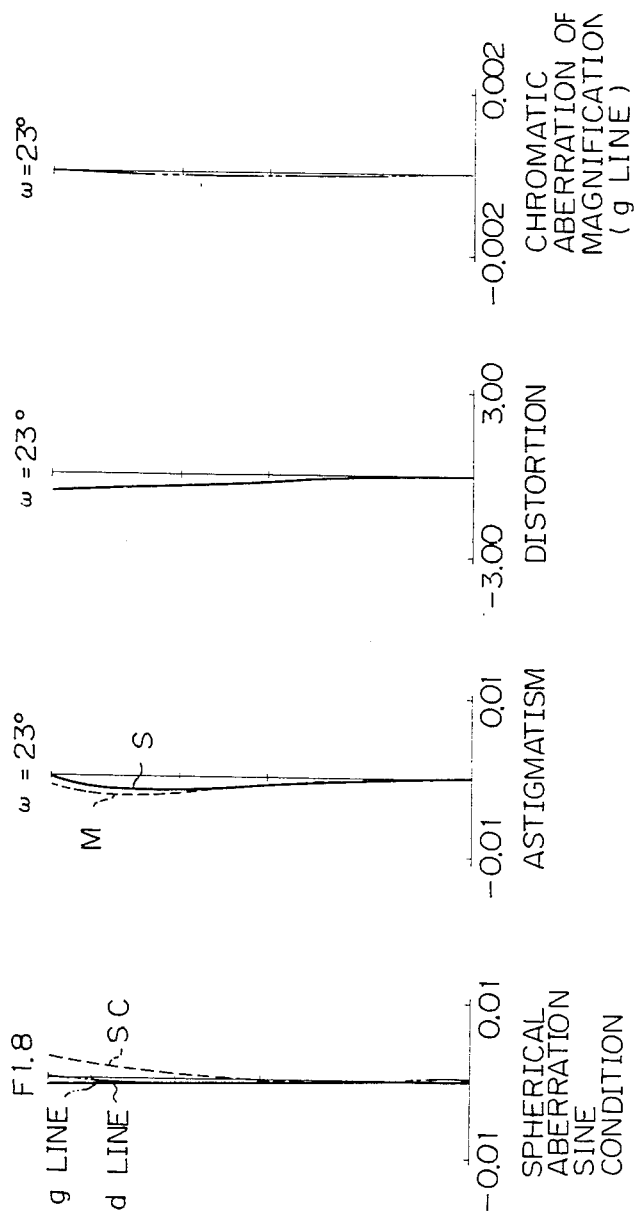
FIG. 12 shows the various aberrations in the imaging lens shown in FIG. 10.

The cross-sectional shape of the lens of the thirty-first embodiment is shown in FIG. 10, the refractive index distributions of the first lens of the thirty-first embodiment disposed on the object side corresponding to d line and g line are shown in FIG. 11A, and the refractive index distributions of the second lens disposed on the image side correspoding to d line and g line are shown in FIG. 11B. In FIGS. 11A and 11B, the ordinate represents the refractive index and the abscissa represents the distance from the optic axis. FIG. 12 shows the various aberrations in the thirty-first embodiment. As shown in FIG. 10, in the lens of the thirty-first embodiment, the surface of the first lens which is adjacent to the object side is planar and the surface thereof which is adjacent to the image side is concave toward the image side, and both of the surfaces of the second lens which are adjacent to the object side and the image side are convex toward the image side. As is apparent from the aberration graph of the thirty-first embodiment shown in FIG. 12, the lens shown in the thirty-first embodiment comprises two lenses and one of the surfaces of the first lens thereof is made planar and yet the various aberrations are well corrected.

The thirty-second embodiment is one in which not only the first surface (the surface of the first lens which is adjacent to the object side) but also the fourth surface (the surface of the second lens which is adjacent to the image side) are made planar, and this embodiment is more advantageous in respect of mass productivity because both of the two lenses are plano-concave lenses.

The thirty-third embodiment is one in which the second surface (the surface of the first lens which is adjacent to the image side) is made planar, and the thirty-fourth embodiment is one in which both surfaces of the first lens are made planar.

TABLE 4-1

| Surface No. | r | d | $N_0$ (d line) | $N_0$ (g line) |
|---|---|---|---|---|
| | | Embodiment 31 | | |
| 1 | 0 | 0.379 | 1.67 | 1.69 |
| 2 | 1.0584 | 0.299 | | |
| 3 | −0.7435 | 0.500 | 1.74 | 1.76 |
| 4 | −4.1148 | | | |

| | | $N_1$ | $N_2$ | $N_3$ |
|---|---|---|---|---|
| 1st lens | d line | −1.4556 | 1.7567 | −1.4329 |
| | g line | −1.4856 | 1.7525 | −1.2052 |
| 2nd lens | d line | −1.5737 | 1.4044 | −0.5212 |
| | g line | −1.5882 | 1.4217 | −0.5389 |

| Surface No. | r | d | $N_0$ | $N_1$ | $N_2$ | $N_3$ |
|---|---|---|---|---|---|---|
| | | | Embodiment 32 | | | |
| 1 | 0 | 0.420 | 1.72 | −1.3892 | 1.5929 | −1.2039 |
| 2 | 0.9771 | 0.302 | | | | |
| 3 | −0.8744 | 0.239 | 1.7 | −1.5004 | 1.3980 | −0.7455 |
| 4 | 0 | | | | | |
| | | | Embodiment 33 | | | |
| 1 | −10.9557 | 0.413 | 1.69 | −0.6760 | 0.5101 | −0.4011 |
| 2 | 0 | 0.275 | | | | |
| 3 | −0.4479 | 0.348 | 1.76 | −2.1986 | 1.5934 | 0.0090 |
| 4 | −1.1353 | | | | | |
| | | | Embodiment 34 | | | |
| 1 | 0 | 0.425 | 1.75 | −0.5881 | 0.4017 | −0.5133 |
| 2 | 0 | 0.245 | | | | |
| 3 | −0.4445 | 0.343 | 1.75 | −2.1825 | 1.5901 | 0.1790 |
| 4 | −1.0913 | | | | | |

TABLE 4-2

| Embodiment | I | II | III | P | V | L | T |
|---|---|---|---|---|---|---|---|
| 31 | 0.053 | −0.027 | −0.004 | 0.068 | 0.131 | 5.00D-4 | 5.05D-4 |
| 32 | 0.046 | −0.044 | 0.015 | 0.061 | 0.204 | | |
| 33 | 0.013 | 0.024 | −0.012 | 0.069 | 0.167 | | |
| 34 | 0.025 | −0.118 | −0.024 | 0.060 | 0.185 | | |

As described above, in the present invention, a medium having a radial gradient is used, whereby an imaging lens in which the various aberrations are well corrected can be realized by a very small number of lenses, i.e., two lenses.

I claim:

1. An imaging lens system formed by two lenses whose refractive index continuously varies in conformity with the distance from the optic axis, comprising:
   a first lens disposed on the object side, said first lens having a refractive index distribution in which the refractive index thereof increase away from the optic axis, the shape of said first lens being a shape in which the thickness thereof is greatest on the optic axis and decreases away from the optic axis; and
   a second lens disposed on the image side, said second lens having a refractive index distribution in which the refractive index thereof decreases away from the optic axis, the shape of said second lens being a shape in which the thickness thereof is smallest on the optic axis and increases away from the optic axis.

2. An imaging lens system according to claim 1, wherein the following conditions are satisfied:

$$1.0 \leq r_1/f \leq 2.9$$

$$-0.5 \leq r_3/f \leq -0.35$$

$$0.3 \leq d_1/f \leq 0.5$$

$$0.28 \leq d_3/f \leq 0.53$$

where f is the focal length of the entire system, $r_1$ is the radius of curvature of the surface of said first lens which is adjacent to the object side, $r_3$ is the radius of curvature of the surface of said second lens which is adjacent to the object side, $d_1$ is the on-axis thickness of said first lens and $d_3$ is the on-axis thickness of said second lens.

3. An imaging lens system according to claim 1, wherein the powers of said first and second lenses are positive.

4. An imaging lens system according to claim 1, wherein the shape of said first lens is a biconvex shape and the shape of said second lens is a meniscus shape having its concave surface facing the object side.

5. An imaging lens system according to claim 1, wherein the shape of said first lens is a meniscus shape having its convex surface facing the object side and the shape of said second lens is a plano-concave shape having its concave surface facing the object side.

6. An imaging lens system according to claim 1, wherein the shape of said first lens is a biconvex shape and the shape of said second lens is a plano-concave shape having its concave surface facing the image side.

7. An imaging lens system according to claim 1, wherein the shape of said first lens is a plano-convex shape having its convex surface facing the object side and the shape of said second lens is a plano-concave shape having its concave surface facing the object side.

8. An imaging lens system according to claim 1, wherein the shape of said first lens is a biconvex shape and the shape of said second lens is a biconcave shape.

9. An imaging lens system formed by two lenses whose refractive index continuously varies in conformity with the distance from the optic axis, comprising:
   a first lens disposed on the object side, said first lens having a refractive index distribution in which the refractive index thereof decreases away from the optic axis, the shape of said first lens being a meniscus shape in which the thickness thereof is smallest on the optic axis and having its concave surface facing the image side; and a second lens disposed on the image side, said second lens having a refractive index distribution in which the refractive index thereof decreases away from the optic axis, the shape of said second lens having a shape in which the thickness thereof is smallest on the optic axis and the surface thereof which is adjacent to the image side is planar or concave.

10. An imaging lens system according to claim 9, wherein the powers of said first lens and said second lens are positive.

11. An imaging lens according to claim 9, wherein the shape of said second lens is a plano-concave shape having its concave surface facing the object side.

12. An imaging lens system according to claim 9, wherein the shape of said second lens is a biconcave shape.

13. An imaging lens system according to claim 9, wherein the following conditions are satisfied:

$$1.7 \leq r_1/f \leq 8.0$$

$$-1.0 \leq r_3/f \leq -0.55$$

$$0.23 \leq d_1/f \leq 0.42$$

$$0.42 \leq d_3/f \leq 0.75$$

where f is the focal length of the entire lens system, $r_1$ is the radius of curvature of the surface of said lens which is adjacent to the object side, $r_3$ is the radius of curvature of the surface of said second lens which is adjacent to the object side, $d_1$ is the on-axis thickness of said first lens and $d_3$ is the on-axis thickness of said second lens.

14. An imaging lens system formed by two lenses whose refractive index continuously varies in conformity with the distance from the optic axis, comprising:

a first lens disposed on the object side, said first lens having a refractive index distribution in which the refractive index thereof decreases away from the optic axis, the shape of said first lens being a meniscus shape in which the thickness thereof is smallest on the optic axis and having its concave surface facing the image side; and a second lens disposed on the image side, said second lens having a refractive index distribution in which the refractive index thereof decreases away from the optic axis, the shape of said second lens being a meniscus shape in which the thickness thereof is smallest on the optic axis and having its concave surface facing the object side; and wherein the following conditions are satisfied:

$$2.0 \leq r_1/f \leq 10.0$$

$$0.9 \leq r_2/f \leq 2.0$$

wherein $r_1$ is the radius of curvature of the surface of said first lens which is adjacent to the object side, $r_2$ is the radius of curvature of the surface of said first lens which is adjacent to the image side, and f if the focal length of the entire system.

15. An imaging lens system according to claim 14, wherein the following conditions are further satisfied:

$$0.24 \leq d_1/f \leq 0.35$$

$$0.36 \leq d_3/f \leq 0.5$$

where $d_1$ is the on-axis thickness of said first lens and $d_3$ is the on-axis thickness of said second lens.

16. An imaging lens system formed by two lenses whose refractive index continuously varies in conformity with the distance from the optic axis, comprising:

a first lens disposed on the object side and having at least one planar surface, the refractive index of said first lens being highest on the optic axis and decreasing away therefrom; and a second lens disposed on the image side, the shape of said second lens being a shape in which the thickness thereof is smallest on the optic axis and increases away from the optic axis, the refractive index of said second lens being highest on the optic axis and decreasing away therefrom.

17. An imaging lens system according to claim 16, wherein the shape of said first lens is a shape in which one surface thereof is planar and the thickness thereof increases away from the optic axis.

18. An imaging lens system according to claim 16, wherein the shape of said first lens is a shape in which both surfaces thereof are planar.

19. An image lens system formed by two lenses whose refractive index continuously varies in conformity with the distance from the optic axis, comprising:

a first lens disposed on the object side, at least one of the surfaces of said first lens being planar; and a second lens disposed on the image side, the shape of said second lens being thinnest on the optic axis and increasing away from the optic axis;

wherein the following conditions are satisfied:

$$-0.95 \leq r_3/f \leq -0.4$$

$$0.21 \leq d_3/f \leq 0.55$$

where $r_3$ is the radius of curvature of the surface of said second lens which is adjacent the object side, $d_3$ is the on-axis thickness of said second lens and f is the focal length of the entire system.

20. An imaging lens system formed by two lenses whose refractive index continuously varies, comprising:

a first lens disposed on the object side, said first lens having a refractive index distribution with a negative refractive power, the shape of said first lens being thickest on the optical axis and decreasing away from the optical axis; and a second lens disposed on the image side, said second lens having a refractive index distribution with a positive refractive power, the shape of said second lens being thinnest on the optical axis and increasing away from the optical axis.

21. An image lens system according to claim 20, wherein the overall refractive power of each of said first and second lenses is positive.

22. An image lens system according to claim 21, wherein the following condition is satisfied:

$$1 \leq r_1/f \leq 2.9$$

where f is the focal length of the entire system and $r_1$ is the radius of curvature of the surface of said first lens which is adjacent the object side.

23. An imaging lens system according to claim 22, wherein the following conditions are satisfied:

$$0.3 \leq d_1/f \leq 0.5$$

$0.28 \leq d_3/f \leq 0.53$ where $d_1$ is the on-axis thickness of said first lens and $d_3$ is the on-axis thickness of said second lens.

24. An imaging lens system according to claim 21, wherein the following condition is satisfied:

$-0.5 \leq r_3/f \leq -0.35$ where f is the focal length of the entire system and $r_3$ is the radius of curvature of the surface of said second lens which is adjacent the object side.

25. An imaging lens system according to claim 24, wherein the following conditions are satisfied:

$0.3 \leq d_1/f \leq 0.5$ $0.28 \leq d_3/f \leq 0.53$ where $d_1$ is the on-axis thickness of said first lens and $d_3$ is the on-axis thickness of said second lens.

26. An imaging lens system according to claim 21, wherein the following conditions are satisfied:

$0.3 \leq d_1/f \leq 0.5$ $0.28 \leq d_3/f \leq 0.53$ where f is the focal length of the entire system, $d_1$ is the on-axis thickness of said first lens and $d_3$ is the on-axis thickness of said second lens.

27. An imaging lens system formed by two lenses whose refractive index continuously varies, comprising:
a first lens disposed on the image side, said first lens having a refractive index distribution with a positive refractive power, the shape of said first lens being thinnest on the optical axis and increasing away from the optical axis; and
a second lens disposed on the image side, said second lens having a refractive index distribution with a positive refractive power, the shape of said second lens being thinnest on the optical axis, the surface of said second lens which is adjacent the image side being planar or concave.

28. An imaging lens system according to claim 27, wherein the overall refractive power of each of said first and second lenses is positive.

29. An image lens system according to claim 28, wherein the following condition is satisfied:

$1.7 \leq r_1/f \leq 8.0$ where f is the focal length of the entire system and $r_1$ is the radius of curvature of the surface of said first lens which is adjacent the object side.

30. An imaging lens system according to claim 29, wherein the following conditions are satisfied:

$0.23 \leq d_1/f \leq 0.42$ $0.42 \leq d_3/f \leq 0.75$ where $d_1$ is the on-axis thickness of said first lens and $d_3$ is the on-axis thickness of said second lens.

31. An imaging lens system according to claim 28, wherein the following condition is satisfied:

$-1.0 \leq r_3/f \leq -0.55$ where f is the focal length of the entire system and $r_3$ is the radius of curvature of the surface of said second lens which is adjacent the object side.

32. An imaging lens system according to claim 31, wherein the following conditions are satisfied:

$0.23 \leq d_1/f \leq 0.42$ $0.42 \leq d_3/f \leq 0.75$ where $d_1$ is the on-axis thickness of said first lens and $d_3$ is the on-axis thickness of said second lens.

33. An imaging lens system according to claim 28, wherein the following conditions are satisfied:

$0.23 \leq d_1/f \leq 0.42$ $0.42 \leq d_3/f \leq 0.75$ where f is the focal length of the entire system, $d_1$ is the on-axis thickness of said first lens and $d_3$ is the on-axis thickness of said second lens.

34. An imaging lens system formed by two lenses whose refractive index continuously varies, comprising:
a first lens disposed on the object side, said first lens having a refractive index distribution with a positive refractive power, the shape of said first lens being a meniscus shape in which the thickness thereof is smallest on the optical axis and having its concave surface facing the image side; and
a second lens disposed on the image side, said second lens having a refractive index distribution with a positive refractive power, the shape of said second lens being thinnest on the optical axis and increasing away from the optical axis;
wherein the following conditions are satisfied:

$2.0 \leq r_1/f \leq 10.0$ $0.9 \leq r_2/f \leq 2.0$ where $r_1$ is the radius of curvature of the surface of said first lens which is adjacent the object side, $r_2$ is the radius of curvature of the surface of said first lens which is adjacent the image side, and f is the focal length of the entire system.

35. An imaging lens system according to claim 34, wherein the overall refractive power of each of said first and second lenses is positive.

36. An imaging lens system according to claim 35, wherein the following conditions are satisfied:

$0.24 \leq d_1/f \leq 0.35$ $0.36 \leq d_3/f \leq 0.5$ where $d_1$ is the on-axis thickness of said first lens and $d_3$ is the on-axis thickness of said second lens.

37. An imaging lens system formed by two lenses whose refractive index continuously varies, comprising:
a first lens disposed on the object side, said first lens having a refractive index distribution with a positive refractive power, the shape of said first lens being a meniscus shape in which the thickness thereof is smallest on the optical axis and having its concave surface facing the image side; and
a second lens disposed on the image side, said second lens having a refractive index distribution with a positive refractive power, the shape of said second lens being thinnest on the optical axis increasing away from the optical axis;

wherein the following conditions are satisfied:

$0.24 \leq d_1/f \leq 0.35$ $0.36 \leq d_3/f \leq 0.5$ where f is the focal length of the entire system, $d_1$ is the on-axis thickness of said first lens and $d_3$ is the on-axis thickness of said second lens.

38. An imaging lens system formed by two lenses whose refractive index continuously varies, comprising:
a first lens disposed on the object side, said first lens having a refractive index distribution with a positive refractive power, at least one surface of said first lens being flat; and
a second lens disposed on the image side, said second lens having a refractive index distribution with a positive refractive power, the shape of said second lens being thinnest on the optical axis increasing away from the optical axis.

39. An image lens system according to claim 38, wherein the overall refractive power of each of said first and second lenses is positive.

40. An image lens system according to claim 39, wherein the following condition is satisfied:

$-0.95 \leq r_3/f \leq -0.4$ where f is the focal length of the entire system and $r_3$ is the radius of curvature of the surface of said first lens which is adjacent the object side.

41. An imaging lens system according to claim 40, wherein the following condition is satisifed:

$0.21 \leq d_3/f \leq 0.55$ where $d_3$ is the on-axis thickness of said second lens.

42. An imaging lens system according to claim 39, wherein the following condition is satisfied:

$0.21 \leq d_3/f \leq 0.55$ where $d_3$ is the on-axis thickness of said second lens and f is the focal length of the entire system.

* * * * *

UNITED STATES PATENT AND TRADEMARK OFFICE
CERTIFICATE OF CORRECTION

PATENT NO. : 4,762,403

DATED : August 9, 1988

INVENTOR(S) : JUN HATTORI

It is certified that error appears in the above-identified patent and that said Letters Patent is hereby corrected as shown below:

Title Page,
>[30] "Japan ....... 59-12575" should read --Japan ....... 59-125751--.

Column 3,
>line 45, "lens," should read --lens--;
>line 46, "lens," should read --lens--.

Column 7,
>line 51, "surface work-" should read --surface,--;
>line 52, "ing," should be deleted.

Column 9
>line 8, entire page 22 of the Specification as conclusion of Table 2-1 continued should be inserted;
>line 17, "aberraticn" should read --aberration--.

UNITED STATES PATENT AND TRADEMARK OFFICE
CERTIFICATE OF CORRECTION

PATENT NO. : 4,762,403
DATED : August 9, 1988
INVENTOR(S) : JUN HATTORI

It is certified that error appears in the above-identified patent and that said Letters Patent is hereby corrected as shown below:

<u>Column 21,</u>
line 1, "axis increasing" should read --axis and increasing--;
line 23, "axis increasing" should read --axis and increasing--.

Signed and Sealed this

Twenty-seventh Day of December, 1988

Attest:

DONALD J. QUIGG

Attesting Officer          Commissioner of Patents and Trademarks